United States Patent [19]

Lougheed et al.

[11] Patent Number: 5,142,589

[45] Date of Patent: Aug. 25, 1992

[54] METHOD FOR REPAIRING IMAGES FOR OPTICAL CHARACTER RECOGNITION PERFORMING DIFFERENT REPAIR OPERATIONS BASED ON MEASURED IMAGE CHARACTERISTICS

[75] Inventors: Robert Lougheed; James Beyer, both of Ann Arbor, Mich.

[73] Assignee: Environmental Research Institute of Michigan, Ann Arbor, Mich.

[21] Appl. No.: 632,010

[22] Filed: Dec. 21, 1990

[51] Int. Cl.⁵ .......................... G06K 9/34; G06K 9/44
[52] U.S. Cl. .......................................... 382/9; 382/54; 382/55
[58] Field of Search .................. 382/9, 13, 55, 54, 18

[56] References Cited

U.S. PATENT DOCUMENTS

| | | | |
|---|---|---|---|
| 3,328,760 | 12/1963 | Beltz | 340/146.3 |
| 3,500,323 | 12/1965 | Funk et al. | 340/146.3 |
| 3,753,229 | 8/1973 | Beun et al. | 382/55 |
| 3,832,682 | 8/1974 | Brok et al. | 340/146.3 |
| 4,024,500 | 5/1977 | Herbst et al. | 340/146.3 |
| 4,066,998 | 1/1978 | Lidkea | 340/146.3 |
| 4,105,998 | 8/1978 | Yoshida et al. | 340/146.3 |
| 4,162,482 | 7/1979 | Su | 382/55 |
| 4,317,109 | 2/1982 | Odaka et al. | 340/146.3 |
| 4,368,462 | 1/1983 | Crowley | 382/54 |
| 4,461,029 | 7/1984 | Van Bilzen et al. | 382/25 |
| 4,498,104 | 2/1985 | Schulz | 382/54 |
| 4,516,174 | 5/1985 | Kammoto | 358/282 |
| 4,607,386 | 8/1986 | Morita et al. | 382/13 |
| 4,646,355 | 3/1987 | Petrick et al. | 382/54 |
| 4,653,107 | 3/1987 | Shojima et al. | 382/13 |
| 4,654,873 | 3/1987 | Fujisawa et al. | 382/9 |
| 4,680,803 | 7/1987 | Dilella | 382/9 |
| 4,718,102 | 1/1988 | Crane et al. | 382/13 |
| 4,731,857 | 3/1988 | Tappert | 382/9 |
| 4,757,549 | 7/1988 | Machart et al. | 382/3 |
| 4,764,972 | 8/1988 | Yoshida et al. | 382/13 |
| 4,783,831 | 11/1988 | Kashioka et al. | 382/34 |
| 4,797,806 | 1/1989 | Krich | 364/900 |
| 4,805,228 | 2/1989 | Jenkins et al. | 382/49 |
| 4,817,034 | 3/1989 | Hardin, Sr. et al. | 364/900 |
| 4,817,186 | 3/1989 | Goolsbey et al. | 382/9 |
| 4,855,933 | 8/1989 | Kondo | 382/55 |
| 4,876,733 | 10/1989 | Lavin | 382/27 |
| 4,887,303 | 12/1989 | Hongo | 382/34 |
| 4,931,953 | 6/1990 | Vehara et al. | 382/55 |

OTHER PUBLICATIONS

"A System for Feature-Model Based Image Understanding" by Brian T. Mitchell and Andrew M. Gillies of Erim, 1987.
"A Model-Based Computer Vision System for Recognizing Handwritten ZIP Codes" by Brian Mitchell and Andres Gillies published in *Machine Visions and Application*, Fall, 1989.

Primary Examiner—David K. Moore
Assistant Examiner—Barry Stellrecht
Attorney, Agent, or Firm—Krass & Young

[57] ABSTRACT

A computer system and method for repairing address blocks and ZIP codes numerical groups before segmentation of the ZIP code in an optical character recognizer. The system repairs the image based upon classification of the image as normal or otherwise. If the class is otherwise, background inclusions and gaps are filled in. If the class is normal, small noise pixel elements are eliminated. Once the ZIP code is located, non-horizontal and horizontal gaps are filled in between strokes and small strokes. The amount of dilation of the strokes and small strokes depends on the size of the strokes. The strokes are dilated and then the dilated area is eroded and shaped to conform to the original strokes. The repair connects strokes before segmentation of the ZIP code block into individual digits.

22 Claims, 7 Drawing Sheets

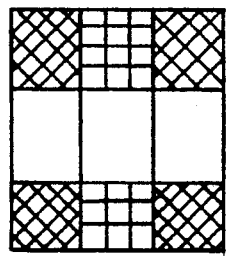
FIG 3
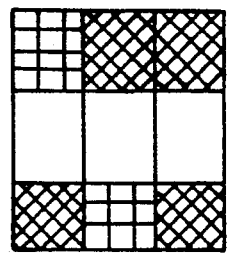
FIG 4
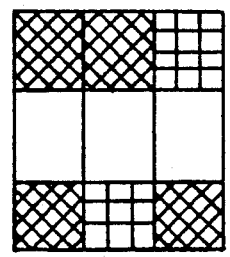
FIG 5
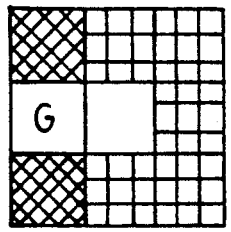
FIG 6
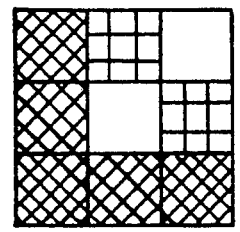
FIG 8
KEY:
 FOREGROUND
 BACKGROUND
 GAP STATE
 DON'T CARE

```
57⤸  0 0 S 0 0      59⤸ 0 0 0 0 0 0 0
     0 0 S 0 0          0 0 0 0 0 0 0
     0 0 S 0 0          S S S S S S S
     0 0 S 0 0          0 0 0 0 0 0 0
     0 0 S 0 0          0 0 0 0 0 0 0
     0 0 S 0 0
     0 0 S 0 0
     0 0 S 0 0
     0 0 S 0 0
     0 0 S 0 0
     0 0 S 0 0        FIG 12
```

KEY:

Sm - SMALL STATE
0 - FLESH STATE
S - STROKE STATE
N - NEW STATE
$N_2$ - NEW$_2$ STATE
E - END STATE
BB - BIG BUD STATE
B - BUD STATE
M - MATCHED DURING THICKEN STEP

```
              N₂N₂N₂N₂N₂N₂N₂N₂
              N₂N  N  N  N  N  N₂
              N₂N  N  N  N  N  N₂
 BB BB BB BB BB BB N₂NN B  B SmSmSm SmSm
 BB EE E  E  E  N₂NNB  B  B   SmSmSmSm
 BB E  E  E  E  N₂NNB  B  B   SmSmSmSm
 BB E  E  E  E  N₂NNB  B  B   SmSm SmSm
 BB E  E  E  E  N₂NNB  B  B   SmSmSmSm
 BB EE E  E  E  N₂N  N  N  N  N  N₂
 K S S S S S   N₂N  N  N  N  N  N₂
 K S S S S S   N₂N₂N₂N₂N₂N₂N₂N₂
 K S S S S S K
 K S S S S S K
 K S S S S S K    FIG 13
 K S S S S S K
```

```
             M S S S S S S S S
 S S S S S S S S S S S S S S S
 S S S S S S S S S S S S S S S
 S S S S S S S S S S S S S S S
 S S S S S S S S S S S S S S S
 S S S S S S S S S S S S S S S
 S S S S S S S S M
 S S S S S S S S
 S S S S S
 S S S S S
 S S S S S
 S S S S S
 S S S S S   FIG 14
 S S S S S
```

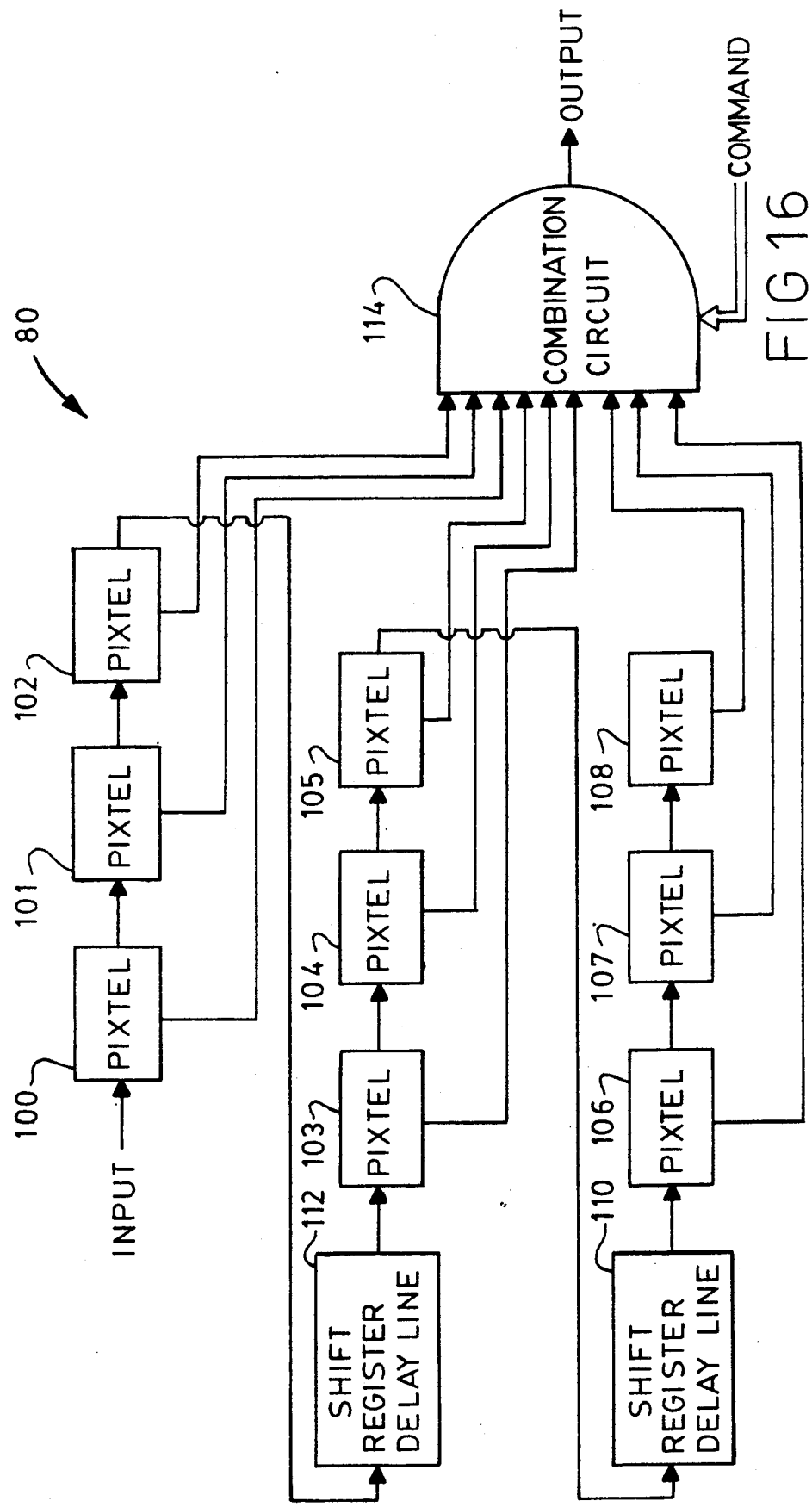

METHOD FOR REPAIRING IMAGES FOR OPTICAL CHARACTER RECOGNITION PERFORMING DIFFERENT REPAIR OPERATIONS BASED ON MEASURED IMAGE CHARACTERISTICS

TECHNICAL FIELD

The present invention relates to a method and system of repairing digital images of broken characters for example handwritten, for subsequent optical character recognition.

BACKGROUND OF THE INVENTION

There are many instances where it would be useful or desirable to provide a computer readable form of a document not available in a compatible computer readable form. Normally it is the case that the document is not available in machine readable form because the document was handwritten or typewritten and thus no computer readable form exists, or because the computer readable form is not available. In some instances there is a "foreign" document, i.e., an existing computer readable form but the document was produced on an incompatible computer system. In some instances, such as facsimile transmission, a simple optical scan of the document can produce the required form. In most instances the form most useful for later use and decision making is a separate indication of each character of the document.

The field of optical character recognition deals with the problem of separating and indicating printed or written characters. In optical character recognition, the document is scanned in some fashion to produce a electrical image of the marks of the document. This image of the marks is analyzed by computer to produce an indication of each character of the document. It is within the current state of the art to produce a reliable indication of many typewritten and printed documents. The best systems of the prior art are capable of properly distinguishing a number of differing type fonts.

On the other hand, unconstrained handwritten characters have not been successfully located and recognized by present optical systems. The problem of properly reading unconstrained handwritten characters is difficult because of the great variability of the characters. One person may not write the same character exactly the same every time. The variability between different persons writing the same character is even greater than the variability of a single person. In addition to the variability of the characters themselves, handwritten text is often not cleanly executed. Thus characters may overlap horizontally. Loops and descenders may overlap vertically. Two characters may be connected together, strokes of one character may be disconnected from other strokes of the same character. Further, the individual written lines may be on a slant or have an irregular profile. The different parts of the handwriting may also differ in size. Thus recognition of handwritten characters is a difficult task.

An example of a field where recognition of handwritten characters would be very valuable is in mail sorting. Each piece of mail must be classified by destination address. Currently, a large volume of typewritten and printed mail is read and sorted using prior art optical character recognition techniques. Presently, approximately 15% of current U.S. mail remains hand addressed. Present technology uses automated conveyor systems to present these pieces of mail, one at a time, to an operator who views the address and enters a code for the destination. This is the most labor intensive, slowest and consequently most expensive part of the entire mail sorting operation.

Furthermore, it is expensive to misidentify a ZIP code and send the piece of mail to the wrong post office. Once the mail is forwarded to the receiving post office, the receiving post office recognizes that there is no matching address or addressee in that ZIP code. The mail must then be resorted and redirected to the proper post office. Because of the high expense associated with misdirected mail, it is more desirable to have an automated system reject a piece of mail if the system cannot determine the ZIP code with an extremely high degree of accuracy. The rejected pieces of mail can then be hand sorted at the sending station or other measures can be taken to eliminate or reduce the cost of the misdelivery.

Once the ZIP code numerals are located, various systems have been devised to recognize handwritten numerals. However, many of these systems are overly complicated to compensate for numerals that deviate from certain normal model numerals. Certain deviations with handwritten numerals commonly occur. For example, the numeral 5 commonly has its top stroke separated from the remaining strokes. This problem occurs so often that the term "hatted 5" has been coined. Another common deviation relates to the numeral 8 in which the top loop is not completely closed but a gap is left between the two end points. This deviation has been coined an "open loop 8." Furthermore, 4's are written in two common ways in which one has a closed triangular upper section on the top and the second has an open U-shaped upper section. Previous recognition systems have used a plurality of models to compensate for these deviations from the norm.

Recognition of handwritten numerals is further complicated when the numerals are in groups. For example, when a hatted 5 precedes a 1 the top stroke of the hatted 5 can often make the subsequent 1 look like a 7.

It has been previously thought that repair of these digits would further complicate matters in converting the numerals into other numerals, for example curved 3's into 8's and 1's into 7's, so that such repair before segmentation of the numeral groups was shunned. However, most numeral recognition devices have a splitter or segmenter which must segment a plurality of digits into individual digits in order that the individual digit may be recognized. The broken strokes such as a top-hatted 5 or a broken 4 can cause the segmenter to incorrectly identify individual digits.

Furthermore, not all digital images are the same quality. Many digital images have additive noise that need to be removed before recognition of numerals proceeds in order to maintain the high reliability needed in recognizing ZIP code numerals. In addition, a certain percentage of images have poor quality and suffer from pixel dropouts of one form or another. These pixel dropouts can cause background inclusions within the character stroke or break the character stroke into segments with a gap therebetween, thereby lowering the reliability of the ZIP code recognizer if not repaired. Image repair of the digital image of an address block containing a ZIP code is therefore needed. The amount and type of repair needs to be customized depending on the quality and classification of the digital image. Furthermore, once the ZIP code is located, further repair on the numeral group is desired before segmentation of the numeral group into individual digits.

What is needed is a method and apparatus which sequentially repairs an image and group of characters in the image by eliminating image noise and connecting broken strokes which assists the segmenter to correctly segment individual numerals before the recognizer acts on the individual numerals.

SUMMARY OF THE INVENTION

In accordance with one aspect of the present invention, an optical character recognizer repairs, locates, and recognizes ZIP code numerals from a digital address block image. The address block image can be derived from an addressed envelope, post card or other label through optical scanning. The digital address block image is comprised of pixels displayed in an array of columns and rows. Preferably, the incoming digital address block image is binary with pixels in the array of columns and rows either being part of the image or part of the background. The address block image includes a plurality of characters made from strokes. The ZIP code forms a portion of the address block image. The ZIP code portion of the digital image is usually located at the lower right portion or near the bottom of the address block.

The optical character recognizer includes a mechanism for identifying and quantifying defects such as small background inclusions in the character strokes and small gaps between the character strokes. Preferably the small gaps that are identified are horizontal. Another mechanism identifies small groups of pixels forming foreground inclusions surrounded by background commonly referred to as noise.

A first repair mechanism repairs the address block image based upon the quantity of small background inclusion or the quantity of small horizontal gaps such that if either quantity is greater than a predetermined respective background inclusion threshold or first gap threshold, the first repair mechanism fills in the small background inclusions and small horizontal gaps of the character strokes.

Preferably, the quantity for small background inclusions is measured as a ratio of the number of pixels identified as background inclusions over the number of pixels identified as part of the digital image. Furthermore, the quantity of small horizontal gaps is measured as a ratio of the number of pixels identified as part of a small horizontal gap over the number of pixels identified as part of the digital image.

In one embodiment, a mechanism skeletonizes the characters into a skeletal image and identifies and quantifies the skeletal ends in the skeletal image. If the quantity of small horizontal gaps is greater than a predetermined second gap threshold that is less than the first gap threshold and the quantity of skeletal ends is greater than a predetermined end threshold, the first repair mechanism fills in the small background inclusions and small horizontal gaps of the character strokes.

Preferably, a mechanism identifies and quantifies T-junctions of the skeletal image. If the quantity of T-junctions is greater than a predetermined T-junction threshold, the first repair mechanism fills in the small background inclusions and small horizontal gaps of the character stroke. The quantity of T-junctions is preferably measured as a ratio of the number of pixels of the digital image identified as T-junctions over the number of pixels identified as part of the skeletal images.

If the first repair mechanism is not employed, a second repair mechanism eliminates the small foreground inclusions, i.e., noise, from the digital image.

Preferably, a plurality of characters or a numeral group (such as a ZIP code) form a part of the digital address block image. After the first or second repair mechanisms repair the whole digital image, a third repair mechanism repairs the ZIP code group of numerals by selectively joining strokes that are nearby but disconnected and filling in background inclusions in the strokes.

Preferably, the third repair mechanism skeletonizes the plurality of numerals into a skeletal image and then eliminates small spurs in the resulting skeletal image to form a filtered skeletal image. The filtered skeletal image has its ends identified and its junctions identified. The identified ends and junctions are dilated by a dilating mechanism over the strokes and beyond the strokes. The dilated image is then eroded and shaped to preserve connectivity between the strokes that have been connected by the dilating mechanism.

Preferably, the dilating mechanism dilates the ends of the filtered skeletal images an amount based on the size of the filtered skeletal images. Preferably the smaller skeletal images are dilated more than larger filtered skeletal images. Preferably the smaller filtered skeletal images that are identified as smaller than a fraction of the height of the plurality of characters are identified as small skeletal images and obtain larger amounts of dilation at their respective ends.

After the third repair mechanism is employed, a segmenting mechanism divides the repaired ZIP code group into individual numeral images and a recognizing mechanism identifies each individual numerals.

In accordance with the broader aspect of the invention, the invention relates to a computer system and method for first repairing of a digital image of pixels based on the quality or character of the digital image and a sequential repairing of a particular character group within the digital image before segmentation of the character group into individual characters.

This computer mechanism and method increases the reliability of an optical character recognizer to correctly identify and recognize a ZIP code and its individual numerals.

BRIEF DESCRIPTION OF THE DRAWINGS

Reference now is made to the accompanying drawings in which:

FIGS. 3, 4, 5 and 6 are schematic illustrations of pixel arrangements in which the center pixel will be identified and relabeled as gap state pixels;

FIG. 8 is a schematic illustration of pixel state arrangements in which the center pixel will be relabeled to the stroke state in the thickening step shown in FIG. 7;

FIG. 12 is an enlarged, fragmentary and schematic illustration of two strokes that are disconnected;

FIG. 13 is a view similar to FIG. 12 illustrating the digital image after dilation of the two strokes;

FIG. 14 is a view similar to FIG. 13 illustrating the strokes after the erosion and shaping has been completed;

FIG. 16 illustrates in block diagram form one of the processing stages of the morphological computer illustrated in FIG. 15.

DETAILED DESCRIPTION OF THE PREFERRED EMBODIMENT

Figure 1:
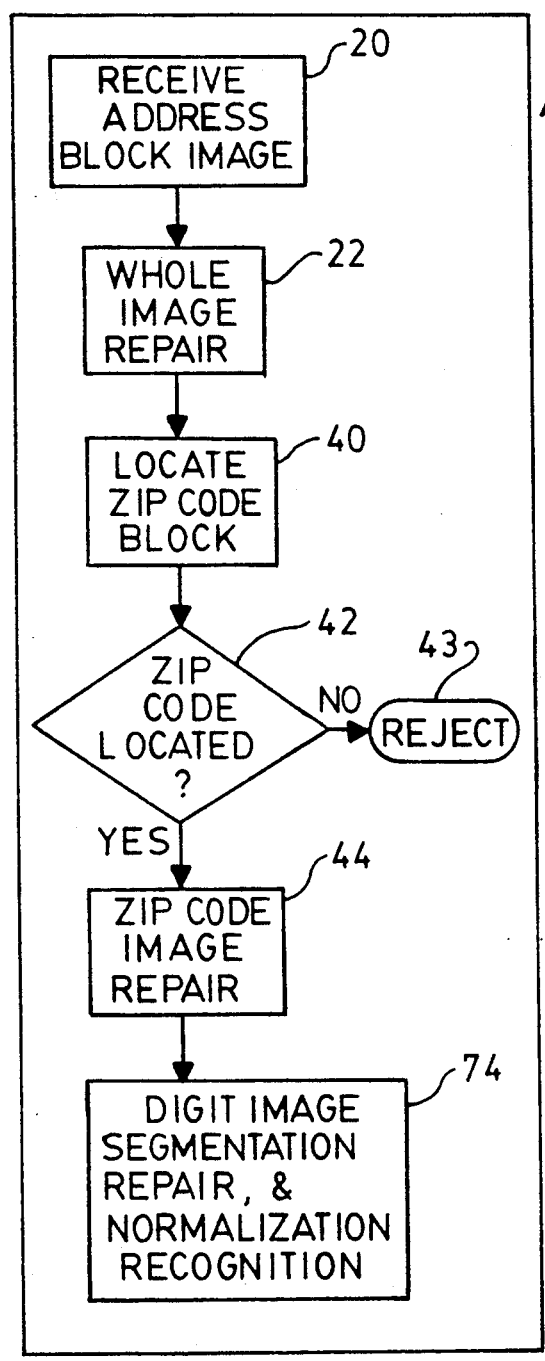
FIG. 1 illustrates in flow chart form the process of address block image repair and ZIP code image repair employed in a ZIP code recognition system.

A repairing system for an optical character recognizer 10 of the present invention implementing the method illustrated in FIG. 1 is capable of repairing an address block image and subsequently a ZIP code within the address block image before digit segmentation of the ZIP code.

Referring now to FIG. 1, a digital address block image is received as shown in step 20. The address block can originally be obtained from an optical scan or can be previously digitized and stored on disk or other computer storage technique. The address block is inputted in digitized form in an array of pixels that are horizontally and vertically spaced at the rows and columns. The pixels of the address block can have various states during the repair steps described later. The states can be any of the following: stroke, small, end, end1, end2, gap, hole, T-junction, touch, noise, fill, skin, new, new2, Bud, Bigbud and flesh, i.e, the part of the image removed during thinning. Other data pixels that do not form part of the image in one of the above states are labeled as background.

Figure 2:
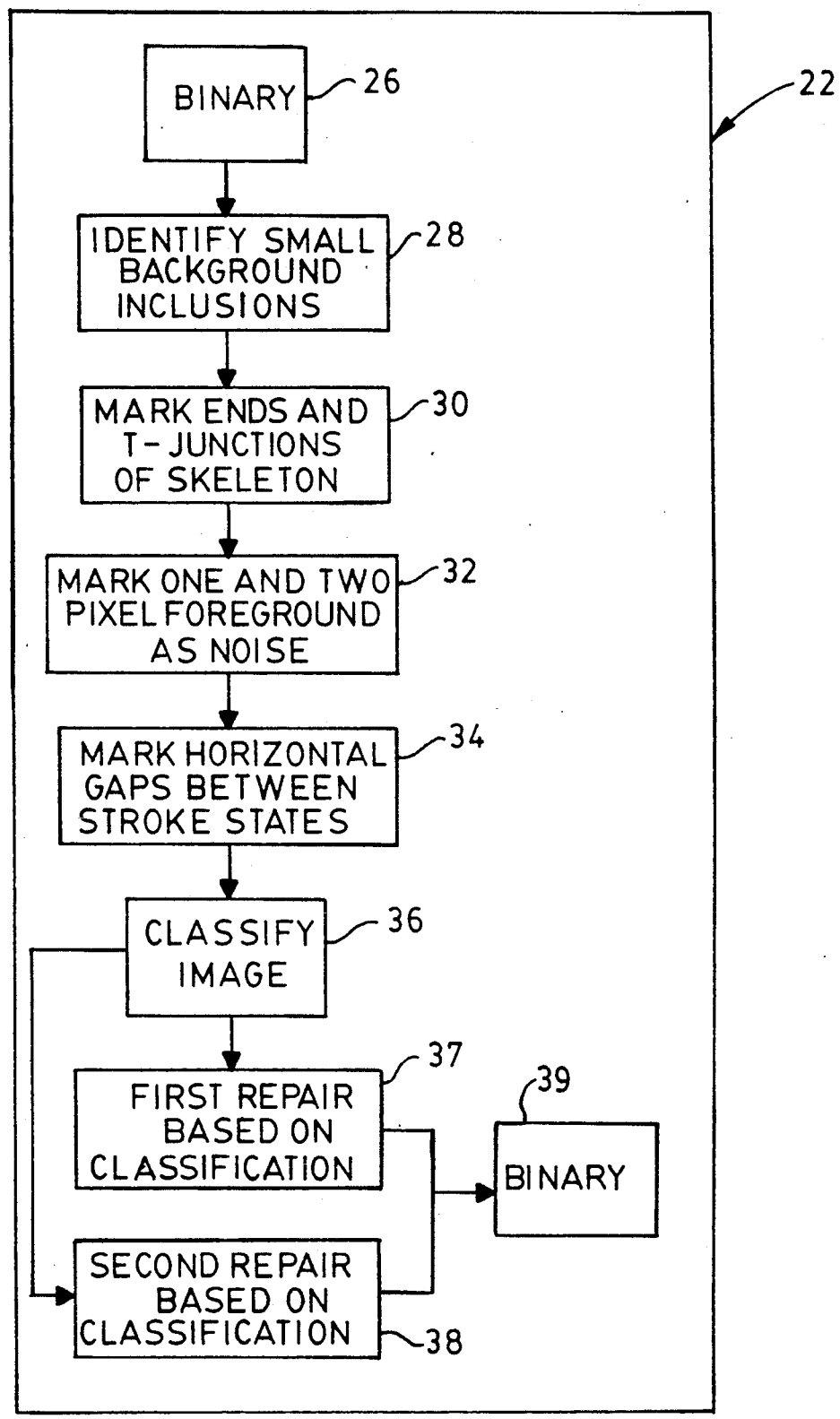
FIG. 2 illustrates in flow chart form the whole image repair step shown in FIG. 1.

The first step shown in step 22 is to repair the whole address block image of defects before locating the ZIP code section or ZIP code characters as shown in step 40. In FIG. 2, the whole image repair step 22 is shown in detail. The first part of the whole image repair step 22 is to assure the incoming image is a binary image as shown in step 26 by relabeling any pixel that has a state other than the background to a stroke state. After the image is made into a binary image, the small background inclusions are then identified as shown by step 28. These background inclusions are groups of pixels that are labeled in the hole state. The hole state for each pixel is found by skeletonizing with four-way connectivity the background pixels and relabeling the background pixels to the hole state. For a character that has been scanned at 212 pixels per inch, it has been determined that three passes of four-way connecting skeletonizing is optimal. The remaining background is then spanned back over the hole state pixels using four-way connectivity to recover the larger background areas. For a character that has been scanned at 212 pixels per inch, it has been determined that six passes of scanning is optimal. If there is a background inclusion of small enough size within a stroke, once the background is skeletonized and pixels are relabeled with the hole state, there will be no background pixels left to span back over the hole state. Therefore, small background inclusions, i.e., small holes are then identified from larger background areas.

The address block image is then skeletonized over eight-way connectivity preserving the ends of the lines and isolated foreground pixels. The end pixels of the skeleton are identified as end state and junctions of the skeleton are identified as a T-junction as shown by step 30. One and two pixel image areas are relabeled as noise as shown by step 32. The one and two pixel image areas are most easily identified by identifying single end state pixels or two end state pixels adjacent to each other and relabeling these end states as noise. Flesh pixels are spanned over the noise state pixels to prevent short and thicker skeletons from being labeled as noise. The noise state pixels spanned over by the flesh state pixels are then relabeled end states.

Small horizontal line gaps between spaced image pixels are then identified as shown by step 34. Any of the configurations identified as shown in FIGS. 3, 4, 5 and 6 or their 180° rotated counterparts relabels the center background pixel as a gap state.

The next step 36 classifies the image as either a normal image or otherwise as a holey or broken image. The quantity of background inclusions, i.e., holes, is determined by counting the number of pixels in the hole state. If the number of pixels in the hole state divided by the number of pixels in a foreground state is greater than a hole threshold ratio of for example, 0.024 then the image is classified as holey. The foreground state is defined as the combined stroke, flesh, ends, T-junctions and noise pixels. The number of T-junction pixels is then determined and compared to the number of stroke (i.e., skeleton) pixels. If the number of T-junction pixels divided by the number of stroke pixels exceeds a ratio of, for example, 0.050, the image is then also classified as holey.

The system divides the pixels in the number of gap state by the number of pixels in the stroke state to determine a ratio. If this ratio is greater than a first gap threshold of, for example, 0.210, then the image is considered to be broken. The system divides the number of end pixels by the number of skeleton pixels. If the gap/stroke area ratio exceeds a second gap threshold of, for example, 0.060, and the end/stroke (i.e., skeleton) ratio is over an end threshold of, for example, 0.250, then the image is classified as broken. If the image is not classified as either holey or broken with the above four quantifications, the image is then classified as a normal class image.

The computer system repairs the address block depending upon the classification that the image receives. If the digital image is classified as holey or broken which for the purposes of repair can both be considered a second class, the repair step 37 is employed and all nonbackground state pixels are relabeled stroke. This results in filling in the background inclusions and the small horizontal gaps between the strokes. If the image has a normal classification, repair step 38 relabels the hole state pixels, gap state pixels and noise state pixels to background. The gaps and any background inclusions in the image are maintained and the noise is eliminated. The image is then returned to a binary state (step 39) by converting all nonbackground pixels to the stroke state.

After the hole image repair step 22 is completed, the ZIP code block comprising of 5 or 9 digits is then located as shown in FIG. 1 by step 40. Reference is made to U.S. patent application 606,578 filed on Oct. 31, 1990 by David McCubbrey entitled "Handwritten Digit Recognition Apparatus & Method", which is assigned to the assignee of this application, for a ZIP code location method that can be used as step 40 in the presently described optical recognizer 10. If no ZIP code is located the address is rejected as shown in step 42. If the ZIP code is located, the ZIP code numeral group is then subsequently repaired as shown in step 44.

Figure 7:
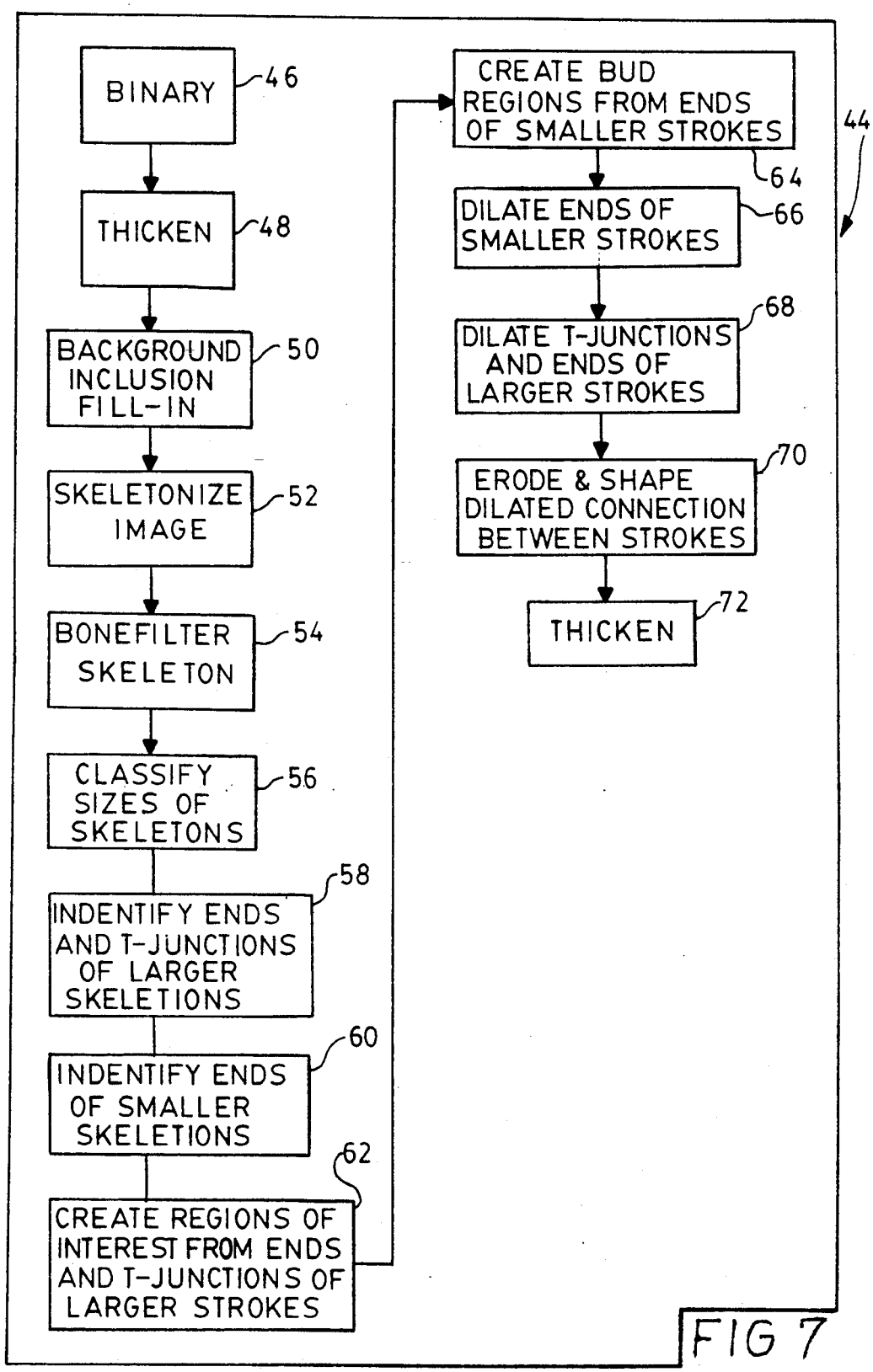
FIG. 7 illustrates in flow chart form the ZIP code image repair step shown in FIG. 1.

Reference now is made to FIG. 7 which illustrates in flow chart form the ZIP code repair step 44. The ZIP code repair step 44 commences by assuring that the image is binary after the ZIP location step 40 by step 46 which converts any pixel that is not of background into a stroke state. The strokes are then thickened by step 48 by use of a matching process. The matching process is illustrated in FIG. 8 where the illustrated pixel arrangement and its other three 90° rotations converts the center background pixel into a stroke pixel. After the strokes are thickened, small background inclusions are filled in as shown in step 50. The background inclusions are filled in by dilating the stroke pixels to its four strong connected neighbors with one pass and relabeling the background pixels to the fill state. The background is then spanned over the fill state pixels through the strong four connected neighbors with five passes. It should be noted that this step is employed even though the whole image repair step 22 includes a background inclusion fill-in for broken or holey images. The background inclusion step 50 is conducted for all classes of images.

Figure 9:
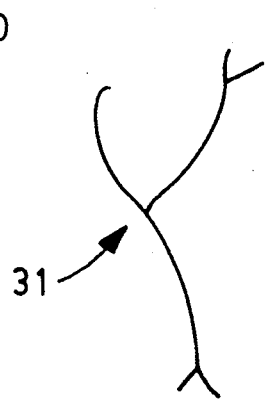
FIG. 9 is a schematic illustration of a skeleton image.
Figure 10:
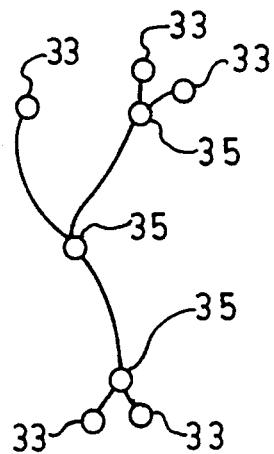
FIG. 10 is the skeleton of FIG. 9 with its end points and T-junction schematically identified and labeled.

The image is then skeletonized with its four strongly connected neighbors preserving the skeleton ends in step 52. It is found that five passes are sufficient because handwritten strokes are rarely wider than ten pixels that are commonly found in today's screen arrays set at 212 pixels per inch. The stroke pixels that are not part of the skeleton are relabeled flesh. The skeleton is then bone filtered as shown in step 54. The object of bone filtering the skeleton image is to rid small spurs from the skeleton. A sample skeletal image is shown in FIG. 9. FIG. 10 shows the skeletal image 31 with its ends 33 and T-junctions 35 schematically marked. The ends and T-junctions are identified and labeled accordingly.

Figure 11:
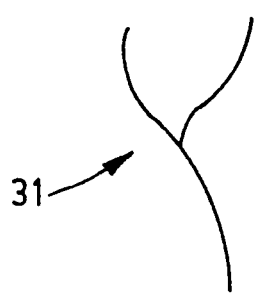
FIG. 11 is an image of the filtered skeleton resulting from the bone filter skeleton step shown in FIG. 7 acting upon the skeleton shown in FIG. 9.

The ends are then spanned over the skeletal state pixels and the skeletal pixels are relabeled as ends. The ends that touch the T-junctions are then spanned over the T-junction pixels where the T-junction pixels are relabeled to a touch state. The touch state pixels are then spanned over end states and relabeled as flesh. The touch state pixels are then relabeled as stroke and the remaining ends are relabeled as stroke along with the remaining T-junctions. It is preferable that the spanning operations in the bonefilter operates on four-way strongly connected neighbors. As such, smaller spurs extending from a T-junction are removed while larger spurs remain as part of the filtered skeletal image as shown in FIG. 11. It is also found optimal to repeat the filtering steps. The first spanning operation of the ends over the skeleton is first conducted with one pass and repeated with two passes. The second spanning operation of the touch pixels over the ends is first conducted with two passes and repeated with three passes. In other applications, further reiterations can occur with the number of passes increasing as the repetitions increase. It has been found that it is best to filter out skeletal spurs that are two pixels or less in length.

The filtered skeletons are now classified according to their size as shown in step 56. An exemplary example of two strokes 57 and 59 are illustrated in FIG. 12 as being disconnected with the skeletons identified with the pixels S. Four-way connected skeletonization is further performed for a number of passes which are dependent upon the vertical height of the ZIP code characters referred to as a SIZEVAL operation. Preferably the number of passes is equal the average height of the ZIP code characters multiplied by ⅜ Any skeleton that is shorter than ⅜ of the vertical height is then relabeled to a small state. The larger skeletons then have the remaining stroke pixels spanned over the small pixels and relabeled stroke pixels. The spanning operation is ⅜ of the vertical height plus five times and the neighborhood for this spanning operation is all eight neighbors. For our purposes, stroke 57 is to be considered large and stroke 59 is considered small. The next step 58 identifies the ends and the T-junctions of the larger skeleton and step 60 identifies the ends of the small skeletons. An end of a large skeleton is labeled end1 and an end of the small skeleton is labeled end2. The T's in the larger skeleton are then spanned over any nonbackground state including flesh and stroke for three passes using eight-neighbor connectivity. The end1 state pixels are spanned over any nonbackground state for one pass based on four-neighbor connectivity. The end1 state pixels are then spanned over any nonbackground state including flesh and stroke for three passes using eight-neighbor connectivity. The purpose of the spanning of the T's and the end1 state pixels is to create regions of interest near the end points or junctions of the large stroke pieces. These are areas to which small pieces may want to be connected. The end1 and the T-junction pixels of the larger skeletons are now spanned over non-background states as shown by step 62. The T-junctions are spanned for 3 passes with eight-way connected and the end1 pixels are spanned for 1 pass with four way connectivity.

The next step 64 eliminates flesh pixels from the small strokes by performing a SIZEVAL operation and spanning small pixels over flesh pixels. The end2 pixels are spanned with a disk over the small pixels to indicate regions of growth. The end2 pixels are then relabeled Bud. Step 64 also relabels the remaining flesh pixels with the state stroke so that larger strokes are separately identified and classified from small strokes.

The next step 66 spans the Bud pixels over background pixels and relabels these pixels NEW. The span is conducted for two passes with eight-way connectivity. A protective skin over parts of the larger regions is formed by spanning of the stroke pixels over the background pixels with four-way connectivity for one pass and relabeling the spanned background pixels as skin. The skin is an area not near the end1 or T-junction pixels that should not have other regions connected to it. The new pixels are spanned with one pass over the background pixels that are relabeled new2. The new2 pixels form a halo around the new pixels. A match relabels some of the skin pixels as new2 pixels if any of the four strongly connected neighbors of skin pixel is a new2 pixel. All of the new2 pixels are then relabeled new.

Step 68 dilates the T-junctions and end1 pixels. All of the T-junction pixels are relabeled as end1. The end1 pixels are spanned with four-way connectivity over the background pixels relabeling them Bigbud. FIG. 13 represents the state of the image after dilation between strokes 57 and 59.

The next step 70 erodes and shapes the dilated ends and T-junctions formed between the strokes. The skin pixels are spanned with four-way connectivity over the Bigbud pixels relabeling the spanned Bigbud pixels as background. Background pixels are spanned over the Bigbud pixels with four-way connectivity relabeling them as background to further reduce the Bigbud pixel area. The remaining Bigbud pixels are relabeled as new pixels. One pass with eight-way connectivity is performed for each of the following steps. End1 pixels are spanned over the new pixels relabeling spanned new pixels end1. Background pixels are spanned over the new pixels relabeling the spanned new pixels as background. The end1 pixels are spanned over new pixels relabeling the spanned new pixels end1 pixel. The background is spanned over the new pixels relabeling the spanned new pixels as background. The skin pixels are then relabeled background. A final spanning with four-way connectivity of the background pixels over the new pixels relabels the spanned new pixels as background and completes the erosion and shaping of the newly formed connection between the strokes. Any remaining nonbackground pixels are relabeled at this point to the stroke state.

A match operation to thicken any loosely connected regions is shown by step 72. The final connection between strokes 57 and 59 is illustrated in FIG. 14. Referring back to FIG. 1, after the ZIP code image repair step 44 the digit image is then segmented and recognized as illustrated by step 74. The result of segmentation is a set of digit images corresponding to the individual numerals of the ZIP code. Because ZIP codes can include either five or nine numerals, there will be either five or nine of the digit images. Each digit can be normalized before the recognition process. Furthermore, individual digit repairs can be employed on the individual numerals.

Figure 15:
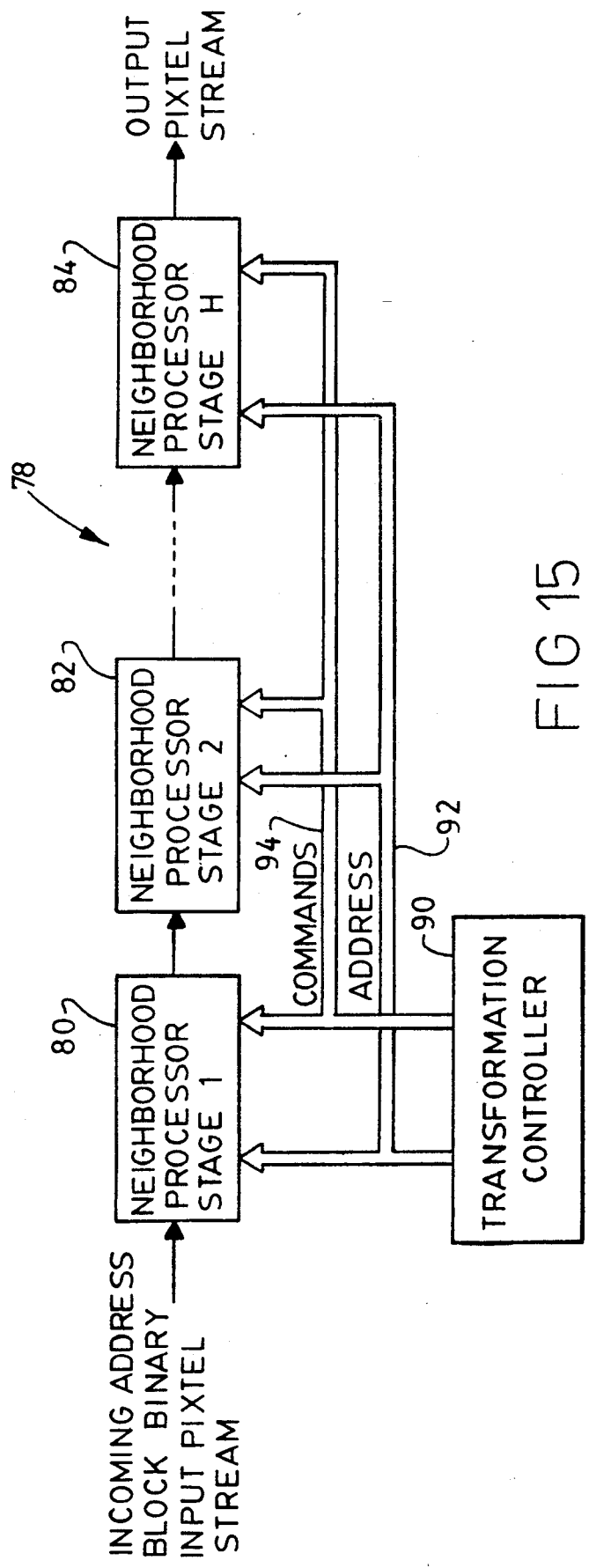
FIG. 15 discloses in block diagram form the morphological computer employed in the preferred embodiment of the present invention.

The computer system used with the ZIP code location process is preferably a morphological type computer which is preferably constructed in accordance with U.S. Pat. No. 4,167,728 issued Sep. 11, 1979 to Sternberg and entitled "Automatic Image Processor" and is commercially known by the mark "Cytocomputer." The teachings of U.S. Pat. No. 4,167,728 are incorporated herein by reference. Briefly, the construction is described in conjunction with FIGS. 15 and 16. The overall construction of the morphological computer 78 is illustrated in FIG. 15 and the construction of a single neighborhood processing stage 80 is illustrated in FIG. 16.

In general, the morphological computer 78 includes a pipeline of a plurality of neighborhood processing stages 80, 82 . . . 84. The first neighborhood processing stage 80 receives as its input a data stream corresponding to individual pixels of a binary image as the incoming address block in a raster scan fashion. The image of the incoming address block includes data corresponding to individual pixels arranged in a plurality of rows and columns. The raster scan data stream consists of pixels in order starting with the left-most pixel of the top row to the right-most pixel, followed by the next row in left to right order followed by each succeeding row in similar fashion.

The neighborhood processing stage 80 in turn produces an output stream of data also corresponding to individual pixels of a transformed image in a raster scan sequence. Each pixel of this output data stream corresponds to a particular pixel of the input data stream. The neighborhood processing stage 80 forms each pixel of the output data stream based upon the value of the corresponding input pixel and the values of the 8 neighboring pixels. Thus, each pixel of the output data stream corresponds to the neighborhood of a corresponding input pixel. The output of each neighborhood processing stage 80, 82 . . . is supplied to the input of the next following stage. The output of the last neighboring processing stage 84 forms the output of the morphological computer 78.

The particular transformation or neighborhood operation performed by each neighborhood processing stage 80, 82 . . . 84 is controlled by transformation controller 90. Each neighborhood processing stage 80, 82 . . . 84 has a unique digital address. The transformation controller 90 specifies a particular address on address line 92 and then specifies a command corresponding to a particular transformation on command line 94. The neighborhood processing stage 80, 82 . . . 84 having the specified address stores the command. Each stage then performs the transformation corresponding to its last received command.

FIG. 16 illustrates in further detail the construction of an exemplary neighborhood processing stage 80. The neighborhood processing stage 80 operates in conjunction with the delay line formed of pixel elements 100-108 and shift register delay lines 110 and 112. Pixel elements 100-108 are each capable of storing the bits corresponding to the data of a single pixel of the input image.

An eight bit or sixteen bit pixel in most foreseeable uses would suffice since standard dilation and skeletonization need to define each pixel in one of five states; background, thinned components, end points, junctions, and "flesh." Shift register delay lines 110 and 112 have a length equal to three less than the number of pixels within each line of the image. The length of the shift register delay lines 110 and 112 are selected to ensure that pixel elements 100, 103 and 106 store data corresponding to pixels vertically adjacent in the input image. Likewise, the data and pixel elements 101, 104, 107 correspond to vertically adjacent pixels and the data in pixel elements 102, 105, 108 correspond to vertically adjacent pixels.

Pixel data is supplied in raster scan fashion to the input of the neighborhood processing stage 80. The pixel is first stored in pixel element 100. Upon receipt of the following pixel, the pixel stored in pixel element 100 is shifted to the pixel element 101 and the new pixel is stored in pixel element 100. Receipt of the next pixel shifts the first pixel to pixel element 102 the second pixel to pixel element 101 and the just received pixel is stored in pixel element 100. This process of shifting data along the delay line continues in the direction of the arrows appearing in FIG. 16. Once the pixel reaches pixel element 108, it is discarded upon receipt of the next pixel.

The neighborhood processing stage 80 operates by presenting appropriate pixel data to combination circuit 114. Note that once the shift delay lines 112 and 110 are filled, pixel elements 100-108 store a 3×3 matrix of pixel elements which are adjacent in the original image. If pixel element 104 represents the center pixel, then pixel elements 100, 101, 102, 103, 105, 106, 107, 108 represent the eight immediately adjacent pixels. This combination circuit 114 forms some combination of the nine pixels. Such combinations could take many forms. The pixel output data may have more or fewer bits than the input data depending on the combination formed. It is also feasible that combination circuit 114 may form comparisons between one or more of the pixels or between a pixel and a constant received from transformation controller 90. The essential point is that combination circuit 114 forms an output pixel from some combination of the pixels stored in the pixel elements 100-108.

The advantage of the arrangement of FIGS. 15 and 16 for image operations is apparent. Each neighborhood processing stage 80, 82 . . . 84 forms a neighborhood operation on the received image data as fast as that data can be recalled from memory. Each stage requires only a fixed delay related to the line length of the image before it is producing a corresponding output pixel stream at the same rate as it receives pixels. Dozens, hundreds or even thousands of these neighborhood processing stages can be disposed in the chain. While each neighborhood processing stage performs only a relatively simple function, the provision of long chains of such stages enables extensive image operations within a short time frame.

As known from the above description, image repair and ZIP code repair requires a complex and extensive computation due to the number of problems that are inherent in handwritten ZIP codes such as jagged lines, irregular spacings, broken strokes, background inclusions and noise. The hardware system such as the one described is needed to provide the computational capacity to work on a typical handwritten address block and ZIP code within that block in a short time.

Variations and modifications of the present invention are possible without departing from the scope and spirit of the invention as defined in the appended claims.

The embodiments in which an exclusive property or privilege is claimed are defined as follows:

1. A method of optical character recognition for indicating a plurality of characters formed by strokes composed of a digital image of pixels, said method comprising the steps of:
    identifying and quantifying small background inclusions in said character strokes;
    identifying and quantifying small gaps between character strokes;
    identifying small image inclusions surrounded by background; and
    repairing said digital image based upon a quantity of small background inclusions or small gaps identified by (a) filling in small background inclusions and gaps of said character strokes if said quantity of small background inclusions is greater than a predetermined hole threshold or the quantity of said small gaps is greater than a predetermined first gap threshold, (b) otherwise eliminating said small image inclusions from said digital pixel image if said quantities are equal to or smaller than said respective thresholds.

2. The method of optical character recognition as defined in claim 1 wherein:
    said hole quantity of small background inclusions being a ratio of the number of pixels identified as background inclusions divided by the number of pixels identified as foreground of the digital image; and
    said first gap quantity of small gaps being a ratio of a number of pixels identified as part of a small gap divided by the number of pixels identified as foreground of the digital image.

3. The method of optical character recognition as defined in claim 1 wherein:
    said step of identifying and quantifying small gaps identifies gaps in horizontally disposed lines.

4. The method of optical character recognition as defined in claim 1 further comprising the steps of:
    skeletonizing said character strokes into skeletal images;
    identifying and quantifying skeletal ends of said skeletal images; and
    said step of repairing said digital image includes filling in said small background inclusions and gaps of said character strokes if said quantity of small gaps is greater than a predetermined second gap threshold that is less than said first gap threshold and a quantity of said skeletal ends is greater than a predetermined end threshold.

5. The method of optical character recognition as defined in claim 4 wherein:
    said hole quantity of small background inclusions being a ratio of the number of pixels identified as small background inclusions divided by the number of pixels identified as part of the character strokes;
    said quantity of small gaps being a ratio of the number of pixels identified as part of a small gap divided by the number of pixels identified as part of the character strokes; and
    said quantity of skeletal ends being a ratio of a number of pixels identified as end pixels divided by the number of pixels identified as part of the skeletal images.

6. The method of optical character recognition as defined in claim 5 further comprising the steps of:
    identifying and quantifying T-junctions of said skeletal images;
    said step of repairing said digital image includes filling in said small background inclusions and small gaps of said character strokes if a quantity of T-junctions is greater than a predetermined T-junction threshold; and
    said quantity of T-junctions being a ratio of the number of pixels of said digital image identified as T-junctions divided by the number of pixels identified as part of the skeletal images.

7. The method of optical character as defined in claim 1 further comprising the steps of:
    skeletonizing said character strokes into skeletal images;
    identifying and quantifying T-junction of said skeletal images; and
    said step of repairing said digital image includes filling in said small background inclusions and small gaps of said character strokes if a quantity of said T-junctions is greater than a predetermined T-junction threshold.

8. The method of optical character recognition for indicating a plurality of characters formed by strokes composed by a digital image of pixels; said method comprising the steps of:
    identifying small background inclusions in said character strokes;
    identifying small gaps between said character strokes;
    identifying small foreground inclusions;
    classifying said digital image as a second class image based upon an identification of at least threshold quantities of small background inclusions or small gaps and as a first class image if said threshold quantities of small background inclusion or small gaps are not identified;
    repairing said plurality of characters if said classifying step identified said digital image as a second class image by filling in said small background inclusions and said small gaps; and eliminating said small foreground inclusions if said classifying step identified said digital image as a first class image.

9. The method of optical character recognition as defined in claim 8 wherein:

said step of identifying and quantifying small gaps identifies gaps in horizontally disposed lines.

10. The method of optical character recognition for indicating a plurality of characters composed of strokes, the method including segmenting the plurality of characters into individual character images, and recognizing the individual character images, the improvement of repairing the plurality of characters comprising the steps of:

filling in background inclusions in the strokes;

skeletonizing the plurality of characters into skeletal images;

eliminating small spurs in said skeletal images to form filtered skeletal images;

identifying said filtered skeletal images in at least two different sizes;

identifying ends and junctions of said filtered skeletal images;

dilating said identified ends and junctions of said filtered skeletal images over the strokes in the digital image and dilating said identified ends and junctions beyond the strokes in the digital image an amount based upon the identified size of said filtered skeletal image; and eroding and shaping said dilated ends and junctions to preserve connectivity between strokes that have been connected to said dilating step.

11. The method of optical character recognition as defined in claim 10 said step of identifying said filtered skeletal images in at least two different sizes includes identifying said filtered skeletal images smaller than a predetermined fraction of the height of said plurality of characters as small skeletal images and identifying said filtered skeletal images larger than said predetermined fraction as large skeletal images.

12. The method of optical character recognition as defined in claim 11 wherein said step of dilating said identified ends and junctions dilates said small skeletal images a greater amount than said large skeletal images.

13. The method of optical character recognition as defined in claim 10 wherein said step of dilating said identified ends and junction dilates smaller sized filtered skeletal images a greater amount than larger sized filtered skeletal images.

14. A method for selectively connecting and repairing strokes of character groups composed of a digital image of pixels, said method comprising the steps of:

filling in small holes within said strokes of said character groups;

skeletonizing said strokes of said character groups into skeletal images:

filtering out small spurs of each skeletal image to form filtered skeletal images;

identifying said filtered skeletal images in at least two different sizes;

identifying end sections and junctions of each filtered skeletal image;

dilating the junction sections and end sections beyond said stroke an amount based on the size of said filtered skeletal image; and eroding and shaping said dilated junctions and end sections to preserve connectivity between strokes that have been connected by said dilating step.

15. A method for selectively joining, fusing and repairing strokes of characters formed by a digital pixel image, said method comprising the steps of:

skeletonizing said strokes of said characters into a skeletal image;

filtering out small spurs in each skeletal image to form filtered skeletal images; and dilating and eroding said filtered skeletal images in a controlled fashion based upon the size of said filtered skeletal images relative to the height of the characters for selectively connecting two nearby strokes.

16. A method of optical character recognition for indicating a plurality of characters formed of strokes composed of a digital image of pixels wherein said plurality of characters forms a portion of said digital image; said method comprising the steps of:

identifying small background inclusions in the character strokes of said digital image;

identifying small gaps between character strokes of said digital image;

identifying small foreground inclusions of said digital image;

classifying said digital image as a second class image based upon the identification of a threshold quantity of small background inclusions in the character strokes or a threshold quantity of small gaps between the character strokes and as a first class image if said threshold quantities are not identified;

repairing said second class digital image by filling in said small background inclusion and said small gaps to form part of said digital image;

repairing said first class digital image by eliminating small image inclusions from said digital image;

repairing said plurality of characters in said portion of said digital image by selectively joining strokes that are slightly disconnected and filling in small background inclusions in said character strokes;

segmenting said plurality of repaired characters into individual character images; and recognizing said individual character images.

17. The method of optical character as defined in claim 16 wherein:

said threshold quantity of small background inclusions being a predetermined ratio of the number of pixels of said digital image identified as small background inclusions divided by the number of pixels identified as part of the character strokes of said digital image; and said threshold quantity of small gaps being a predetermined ratio of the number of pixels of said digital image identified as part of a small gap divided by the number of pixels identified as part of the character strokes of said digital image.

18. The method of optical character recognition as identified in claim 16 wherein:

said step of repairing said plurality of characters in said portion of said digital images includes;

filling small background inclusions in said strokes of said plurality of characters;

skeletonizing said strokes of said character groups into a skeletal image;

filtering out small spurs of each skeletal image to form filtered skeletal images;

identifying said filtered skeletal images in at least two different sizes;

identifying end sections and junctions of each filtered skeletal image;

dilating the end sections and junctions beyond said strokes an amount based on the size of the filtered skeletal image; and eroding and shaping said extended end sections and junctions in order to selectively join two nearby strokes.

19. A method for repairing a digital image forming characters composed of strokes, said method comprising the steps of:

identifying small background inclusion in said strokes;

identifying small gaps between said strokes;

identifying small foreground inclusions of said digital image surrounded by a background;

quantifying said small background inclusions to determine if a predetermined threshold quantity of small background inclusions is exceeded;

quantifying said small gaps to determine if a predetermined threshold quantity of small gaps is exceeded; and repairing said digital image by filling in said small gaps and said small background inclusions if either of said predetermined thresholds are exceeded and if neither predetermined threshold is exceeded by eliminating said small foreground inclusions.

20. A method for repairing a digital image forming characters composed of strokes, said method comprising the steps of:

identifying defects in said digital image;

classifying said digital image in one of at least two classes based on the amount and kind of identified defects;

repairing said digital image based on the class selected by said classifying means;

selecting a portion of said digital image; and repairing said selected portion of said digital image by selectively joining strokes that are slightly disconnected.

21. A method of optical character recognition for indicating a plurality of characters formed of strokes composed of a digital image of pixels, said method comprising the steps of:

identifying and quantifying small background inclusions in said character strokes;

identifying and quantifying small gaps between character strokes;

identifying small image inclusions surrounded by background; and repairing said digital image by filling in said small background inclusions and gaps of said character strokes if either said quantity of small background inclusions is greater than a predetermined hole threshold or the quantity of said small gaps is greater than a predetermined first gap threshold.

22. A method of optical character recognition for indicating a plurality of characters formed by strokes composed of a digital image of pixels, said method comprising the steps of:

identifying and quantifying small background inclusions in said character strokes;

identifying and quantifying small gaps between character strokes;

identifying small image inclusions surrounded by background; and repairing said digital image by eliminating said small image inclusions from said digital pixel image if neither said quantity of small background inclusions is greater than a predetermined hole threshold nor the quantity of said small gaps is greater than a predetermined first gap threshold.

* * * * *